United States Patent
Davis et al.

(10) Patent No.: US 10,301,191 B2
(45) Date of Patent: May 28, 2019

(54) SYSTEM AND METHOD FOR REMOVING SUSPENDED SOLIDS, AFFILIATED AND DISSOLVED POLLUTANTS FROM STORMWATER RUNOFF USING ADSORBENT MEDIA MIXTURE

(71) Applicants: University of Maryland, College Park, MD (US); Low Impact Development Design Group, LLC, Beltsville, MD (US); The United States of America, as represented by the Secretary of Agriculture, Washington, DC (US)

(72) Inventors: Allen P. Davis, Laurel, MD (US); Neil A. Weinstein, Silver Spring, MD (US); Rufus L. Chaney, Beltsville, MD (US)

(73) Assignees: UNIVERSITY OF MARYLAND, College Park, MD (US); LOW IMPACT DEVELOPMENT DESIGN GROUP, LLC, Beltsville, MD (US); The United States of America, as represented by the Secretary of Agriculture, Washington, DC (US)

(*) Notice: Subject to any disclaimer, the term of this patent is extended or adjusted under 35 U.S.C. 154(b) by 0 days.

(21) Appl. No.: 14/837,730

(22) Filed: Aug. 27, 2015

(65) Prior Publication Data

US 2016/0060139 A1 Mar. 3, 2016

Related U.S. Application Data

(60) Provisional application No. 62/042,571, filed on Aug. 27, 2014.

(51) Int. Cl.
*C02F 1/28* (2006.01)
*B01D 39/06* (2006.01)
(Continued)

(52) U.S. Cl.
CPC ............ *C02F 1/281* (2013.01); *B01D 39/02* (2013.01); *B01D 39/06* (2013.01); *B01D 39/08* (2013.01);
(Continued)

(58) Field of Classification Search
CPC .... C02F 1/281; C02F 1/286; C02F 2101/105; C02F 2101/20; C02F 2103/001;
(Continued)

(56) References Cited

U.S. PATENT DOCUMENTS 8,721,885 B2 * 5/2014 Drizo ................ C02F 1/281
 210/259
2001/0054588 A1 * 12/2001 Smith ................ B01J 20/02
 210/662

(Continued)

FOREIGN PATENT DOCUMENTS

CN 102936911 A * 2/2013

OTHER PUBLICATIONS

Machine-generated English translation of CN 102936911 A, generated on Nov. 23, 2016.*
(Continued)

*Primary Examiner* — Fred Prince
(74) *Attorney, Agent, or Firm* — Carter, DeLuca & Farrell LLP; George Likourezos

(57) ABSTRACT

A filtration system and method are provided for removing suspended solids and other affiliated pollutants from stormwater runoff and any other contaminated water. The filtration system and method utilize a filtration medium including steel slag. By improving or replacing a conventional filtration media, such as a sand filtration system, with a filtration medium including steel slag, the removal efficiency of suspended solids and affiliated pollutants is improved and the lifespan of the filtration system is lengthened.

17 Claims, 2 Drawing Sheets

(51) Int. Cl.
*B01D 39/02* (2006.01)
*B01D 39/08* (2006.01)
*C02F 1/32* (2006.01)
*C02F 3/32* (2006.01)
*C02F 101/10* (2006.01)
*C02F 101/20* (2006.01)
*C02F 103/00* (2006.01)

(52) U.S. Cl.
CPC .............. *C02F 1/286* (2013.01); *C02F 1/288* (2013.01); *C02F 3/327* (2013.01); *C02F 2101/105* (2013.01); *C02F 2101/20* (2013.01); *C02F 2103/001* (2013.01)

(58) Field of Classification Search
CPC ......... C02F 1/288; B01D 39/06; B01D 39/02; B01D 39/08
USPC ......... 210/602, 747.2, 747.3, 906, 907, 912, 210/170.03, 263
See application file for complete search history.

(56) References Cited

U.S. PATENT DOCUMENTS

| | | | | |
|---|---|---|---|---|
| 2008/0080936 | A1* | 4/2008 | Quinley | E02B 3/127 405/302.7 |
| 2008/0121579 | A1* | 5/2008 | Dierkes | C02F 1/281 210/170.03 |
| 2009/0261036 | A1* | 10/2009 | Lucas | C02F 1/004 210/602 |
| 2010/0243571 | A1* | 9/2010 | Semiat | B01J 20/06 210/668 |
| 2011/0049057 | A1* | 3/2011 | Grubb | A62D 3/33 210/682 |
| 2011/0180488 | A1* | 7/2011 | Tonegawa | B01D 39/06 210/747.5 |
| 2012/0048806 | A1* | 3/2012 | Drizo | C02F 1/281 210/668 |
| 2012/0091057 | A1* | 4/2012 | Kent | C02F 3/10 210/602 |
| 2014/0144835 | A1* | 5/2014 | Chai | E04D 11/002 210/602 |
| 2014/0202564 | A1* | 7/2014 | Trauth | E03B 1/00 137/561 A |
| 2016/0030867 | A1* | 2/2016 | Love | B01D 39/08 210/237 |

OTHER PUBLICATIONS

Bradl, "Adsorption of heavy metal ions on soils and soils constituents", Elsevier, J. of Colloid & Interface Science, 277, pp. 1-18 (Apr. 2004).
Brown et al., "Effect of Biosolids Processing on Lead Bioavailability in an Urban Soil", Heavy Metals in the Environment, J. Environ. Qual, 32, pp. 100-108 (Jan.-Feb. 2003).
Brown et al., The Phytoavailability of Cadmium to Lettuce in Long-Term Biosolids-Amended Soils, J. Environ. Qual., 27, pp. 1071-1078 (Sep. 1998).
Bunzl et al., "Kinetics of Ion Exchange in Soil Organic Matter", J. of Soil Science, 27, pp. 32-41 (1976).
Elliott et al., "Competitive Adsorption of Heavy Metals by Soils", Technical Reports, J. Environ. Qual., vol. 15, No. 3, pp. 214-219 (Jul. 1986).
Gibert et al., "Municipal compost-based mixture for acid mine drainage bioremediation: Metal retention mechanisms", Elsevier, Applied Geochemistry, 20, pp. 1648-1657 (Jul. 2005).
Goto et al., "Occlusion of Transition Metal Ions by New Adsorbents Synthesized from Plant Polyphenols and Animal Fibrous Proteins", Humana Press, Inc., Applied Biochemistry and Biotechnology, vol. 84-86, pp. 1021-1038 (2000).
Hamon et al., "Mechanisms of Attenuation of Metal Availability in In Situ Remediation Treatments", American Chemical Society, Environ. Sci. Technol., 36, pp. 3991-3996 (Aug. 2002).
Han et al., "Copper-Binding Ability of Dissolved Organic Matter Derived from Anaerobically Digested Biosolids", J. Environ. Qual, 28, pp. 939-944 (May 1999).
Harter, "Effect of Soil pH on Adsorption of Lead, Copper, Zinc, and Nickel", Soil Sci. Soc. Am. J., vol. 47, pp. 47-51 (Jan. 1983).
Ho et al., "Equilibrium sorption isotherm for metal ions on tree fern", Elsevier, Process Biochemistry, 37, pp. 1421-1430 (Jan. 2002).
Ho et al., "Sorption of lead ions from aqueous solution using tree fern as a sorbent", Elsevier, Hydrometallurgy, 73, pp. 55-61 (2004).
Hsu et al., "Effect of dissolved organic carbon on leaching of copper and zinc from swine manure compost", IWWA, Water Science and Technology, vol. 42, Nos. 3-4, pp. 247-252 (2000).
Jang et al., "The removal of heavy metals in urban runoff by sorption on mulch", Elsevier, Environmental Pollution, 133, pp. 117-127 (2005).
Li et al., "Response of Four Turfgrass Cultivars to Limestone and Biosolids—Compost Amendment of a Zinc and Cadmium Contaminated Soil at Palmerton, Pennsylvania", J. Environ. Qual., 29, pp. 1440-1447 (Sep. 2000).
Moreno et al., "Factors influencing lead sorption-desorption at variable added metal concentrations in Rhodoxeralfs", Elsevier, Chemosphere, 64, pp. 758-763 (2006).
Pandey et al., "Stability Constants of Metal-Humic Acid Complexes and Its Role in Environmental Detoxification", Academic Press 2000, Ecotoxicology and Environmental Safety, 47, pp. 195-200 (Feb. 2000).
Proctor et al., "Physical and Chemical Characteristics of Blast Furnace, Basic Oxygen Furnace, and Electric Arc Furnace Steel Industry Slags", American Chemical Society, Environ. Sci. Technol., 34, No. 8, pp. 1576-1582 (2000).
Seelsaen et al., "Influence of compost characteristics on heavy metal sorption from synthetic stormwater", IWWA Publishing, Water Science & Technology, vol. 55, No. 4, pp. 219-226 (2007).
Smidt et al., "Co-Composting of lignin to build up humic substances—Strategies in waste management to improve compost quality", Elsevier, Industrial Crops and Products, 27, pp. 196-201 (2008).
An Analysis of Composting as an Environmental Remediation Technology, US Environmental Protection Agency EPA530R-98-008, 115 pgs. (Apr. 1998).
Weng et a., "Complexation with Dissolved Organic Matter and Solubility Control of Heavy Metals in a Sandy Soil", American Chemical Society, Environ. Sci Technol., 36, No. 22, pp. 4804-4810 (Oct. 2002).
Yousfi et al., "Physical-Chemical Approach to Assess the Effectiveness of several amendments used for in situ remediation of trace metals-contaminated soils by adding solid phases", CRC Press LLC, Environmental restoration of metals contaminated soils, pp. 3-20 (2001).
Yu et al., "The removal of heavy metal from aqueous solutions by sawdust adsorption—removal of copper", Elsevier, J. of Hazardous Materials, B80, pp. 33-42 (2000).
Zhou et al., "Effect of Dissolved Organic Matter from Sludge and Sludge Compost on Soil Copper Sorption", J. Environ. Qual., 30, pp. 878-883 (May 2001).
Chien et al., Characterization of Humic Substances Derived from Swine Manure-Based Compost and Correlation of Their Characteristics with Reactivities with Heavy Metals, American Chemical Society, J. Agric. Food Chem., vol. 55, No. 12, pp. 4820-4827 (May 2007).
Evans, "Chemistry of metal retention by soils", American Chemical Society, Environ. Sci. Technol., vol. 23, No. 9, pp. 1046-1056 (1989).
Irving et al., Order of Stability of Metal Complexes, Nature Publishing Group, vol. 162, No. 4123, pp. 746-747 (Nov. 1948).
Madrid, "Metal Retention and Mobility as Influenced by Some Organic Residues Added to Soils: A Case Study", Fate and Transport of Heavy Metals in the Vadose Zone, Lewis Publishers, Boca Raton, FL, Ch. 10, pp. 201-223 (1999).

(56) References Cited

OTHER PUBLICATIONS

Zhou et al., "Sorption of Heavy Metals by Inorganic and Organic Components of Solid Wastes: Signficance to Use of Wastes as Low-Cost Adsorbents and Immobilizing Agents", Taylor & Francis Group LLC, Critical Reviews in Environmental Science and Technology, 40, pp. 909-977 (2010).

* cited by examiner

Fig. 2 A
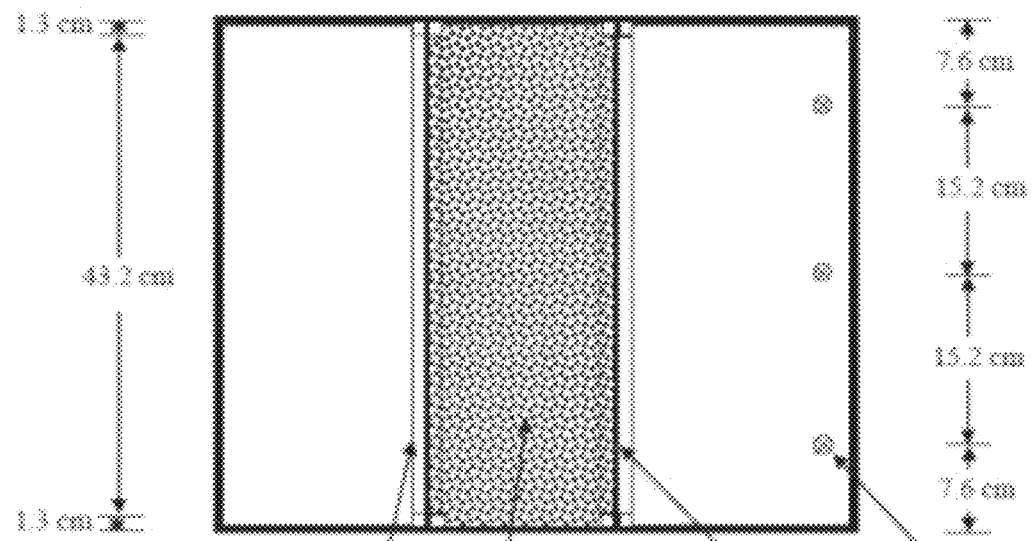
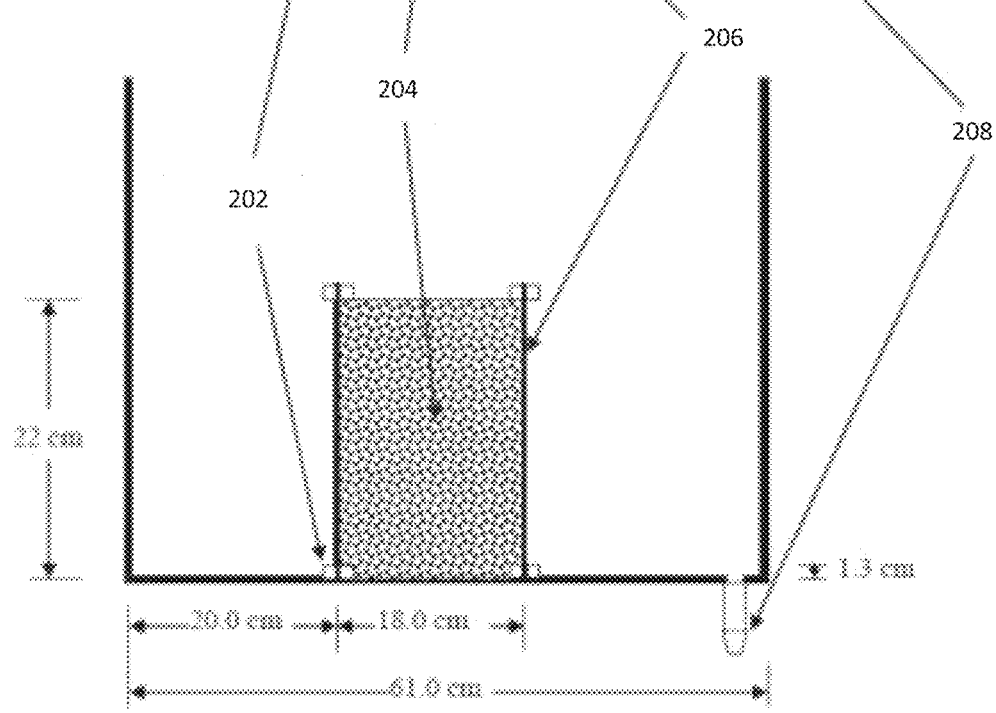
Fig. 2 B

SYSTEM AND METHOD FOR REMOVING SUSPENDED SOLIDS, AFFILIATED AND DISSOLVED POLLUTANTS FROM STORMWATER RUNOFF USING ADSORBENT MEDIA MIXTURE

PRIORITY CLAIM

The present application claims priority to and the benefit of the previously filed provisional application to Allen P. Davis et al. having U.S. Provisional Patent Application No. 62/042,571, entitled "BIOMAT FOR TREATMENT OF STORMWATER RUNOFF," filed on Aug. 27, 2014, the entire contents thereof are incorporated herein by reference.

GOVERNMENT SUPPORT

The United States Department of Agriculture (under grant Award No. 5812657009) provided funding related to the research leading to these invention(s). The government may have rights to this invention(s).

BACKGROUND

Technical Field

The present disclosure relates to a stormwater runoff filtration/sorption system and method. In particular, the present disclosure relates to a filtration/sorption system and method for removing dissolved metals and suspended solids, affiliated and dissolved pollutants from stormwater runoff utilizing filtration/sorption media including steel slag.

Description of Related Art

Stormwater runoff is rain that falls on streets, parking areas, sports fields, gravel lots, rooftops, or other developed land and flows into nearby lakes, rivers and other bodies of water. The drizzling or pounding rain picks up and mixes with materials on the ground, such as oil, grease, metals, coolants from vehicles, fertilizers, pesticides and other chemicals from gardens and homes, bacteria from animal waste and failing septic systems, soil from construction sites and other bare ground, soaps and other cleaning fluids from car or equipment washing, and accidental spills, leaky storage containers, and various other materials that end up on the ground. The polluted runoff then rushes into nearby gutters and storm drains and into streams, lakes, rivers, and bays. In most areas, stormwater runoff enters these waters without being cleaned of pollutants.

Poorly managed stormwater runoff causes three big problems: (1) pollution from stormwater runoff contaminates waters, closes local businesses, and harms or kills fish and other wildlife. As stormwater passes over developed land, it picks up pollutants and transports them to the nearest storm drain and eventually rivers and bays. (2) Flooding harms streams and wetlands and destroys habitat needed for fish and other wildlife. Unable to soak into the ground, stormwater runoff quickly flows or floods downstream from developed land during the rainy season. As a result, floods can damage homes and businesses, flood septic system drain fields and overwhelm streams, wetlands, and wildlife habitat. (3) Water shortages in growing communities may occur, especially in developed areas with impervious surfaces or areas where water cannot filtrate through, such as roads, parking lots, and rooftops. The impervious surfaces keep rainfall from soaking into the ground and replenishing groundwater and streams used for drinking water or fish habitat.

There is therefore a need for a filtration/sorption system and method for removing suspended solids, affiliated and dissolved pollutants from stormwater runoff that overcomes the drawbacks of conventional systems and methods.

There is also a need for filtration/sorption media that can be retrofitted into existing containers used for storm drains and other discharge areas for removing suspended solids, affiliated and dissolved pollutants.

SUMMARY

The present disclosure provides a filtration/sorption system and method for removing suspended solids, affiliated and dissolved pollutants from stormwater runoff or other contaminated water streams. The filtration/sorption system and method utilize filtration/sorption media including steel slag. By improving or replacing a conventional filtration/sorption system's filtration/sorption media, such as a sand filtration/sorption system, with filtration/sorption media including steel slag without or with stable organic matter such as compost, the removal efficiency of suspended solids, affiliated and dissolved pollutants is improved and the lifespan of the filtration/sorption system is lengthened due to simpler cleaning processes and a reduced need for material replacements. The filtration/sorption media can be retrofitted into existing containers that are employed along the fluid flow in existing storm filtration, drainage systems, and other fluid discharge areas.

In an embodiment of the present disclosure, an stormwater runoff system utilizing filtration media including steel slag without or with stable organic matter is provided for removing suspended solids, affiliated and dissolved pollutants from stormwater runoff. While various other components are also including in the filtration media, including compost and sand, experiments have shown that the addition of steel slag is particularly beneficial to the removal efficiency and longevity of the filtration system.

Therefore, in an aspect of the present disclosure there is provided a filter comprising a geosynthetic material configured for being positioned along a fluid path, and a filtration medium including steel slag without or with stable organic matter, wherein suspended solids pollutants are carried along the fluid path by fluid flow and are removed from the fluid flow by the filtration medium.

In a further aspect of the present disclosure, the filtration medium further includes sand and compost (one form of stable organic matter).

In yet a further aspect of the present disclosure, the composition of the filtration medium is 5% by weight steel slag, 25% by weight compost, and 70% by weight sand.

In another aspect of the present disclosure, the filter further comprises an aluminum oxide sorbent or water treatment residual (WTR) rich in aluminum and iron oxides and hydroxides.

In yet another aspect of the present disclosure, vegetation is grown in or through the filter.

In a further aspect of the present disclosure, the fluid flow comprises stormwater runoff or any other contaminated water.

In another aspect of the present disclosure, the filter is configured for placement in proximity to an opening of a drainage system.

In an aspect of the present disclosure, a filtration medium comprises steel slag, wherein suspended solids and other pollutants are allowed to flow through the filtration medium and are removed by the filtration medium.

In a further aspect of the present disclosure, the filtration medium further comprises sand and compost or other stable organic matter resource.

In yet a further aspect of the present disclosure, the composition of the filtration medium is 5% by weight steel slag, 25% by weight compost (or other stable organic matter resources), and 70% by weight sand.

In another aspect of the present disclosure, the filtration medium further comprises an aluminum oxide sorbent or WTR rich in aluminum and iron oxides and hydroxides.

In a further aspect of the present disclosure, vegetation is grown in or through the filtration medium.

In another aspect of the present disclosure, the steel slag is blast furnace produced steel slag.

In an aspect of the present disclosure, a method for removing suspended solids and other pollutants from fluid flow comprises receiving the fluid flow containing suspended solids and other pollutants, providing a filter comprising a geosynthetic material along the fluid flow, providing a filtration medium including steel slag without or with stable organic matter, and removing the suspended solids and other pollutants from the fluid flow using the filtration medium.

In a further aspect of the present disclosure, the filtration medium further includes sand and compost (or other stable organic matter resource).

In yet a further aspect of the present disclosure, the composition of the filtration medium is 5% by weight steel slag, 25% by weight compost (or stable organic matter resource0, and 70% by weight sand.

In another aspect of the present disclosure, the filter further comprises an aluminum oxide sorbent or WTR rich in aluminum and iron oxides or hydroxides.

In yet another aspect of the present disclosure, vegetation is grown in or through the filter.

In another aspect of the present disclosure, the suspended solids and other pollutants include lead, copper, zinc, and/or other trace metals.

In a further aspect of the present disclosure, the aluminum oxide or WTR sorbent is used to remove phosphate from the fluid flow.

In another aspect of the present disclosure, the method further comprises placing the filter in proximity to an opening of a drainage system.

BRIEF DESCRIPTION OF THE DRAWINGS

These and other advantages will become more apparent from the following detailed description of the various embodiments of the present disclosure with reference to the drawings wherein:

FIGS. 2A and B are diagrams showing an example filtration/sorption system using the filtration/sorption medium, according to an embodiment of the present disclosure.

DETAILED DESCRIPTION

In the Summary section above, in this Detailed Description, in the Claims below, and in the accompanying drawings, reference is made to particular features (including method steps or acts) of the present disclosure. It is to be understood that the disclosure in this specification includes combinations of parts, features, or aspects disclosed herein. For example, where a particular feature is disclosed in the context of a particular aspect or embodiment of the present disclosure, or a particular claim, that feature can also be used, to the extent possible, in combination with and/or in the context of other particular aspects and embodiments of the present disclosure, and in the disclosure generally.

The term "comprises" and grammatical equivalents thereof are used herein to mean that other components, ingredients, steps, acts, etc. are optionally present. For example, an article "comprising (or "which comprises") component A, B, and C can consist of (i.e., contain only) components A, B, and C, or can contain not only components, A, B, and C but also one or more additional components, elements, features, ingredients, steps, acts, etc.

Where reference is made herein to a method comprising two or more defined steps or acts, the defined steps or acts can be carried out in any order or simultaneously (except where the context excludes that possibility); and the method can include one or more other steps or acts which are carried out before any of the defined steps or acts, between two of the defined steps or acts, or after all the defined steps or acts (except where the context excludes that possibility).

When, in this specification, a range is given as "(a first number) to (a second number)" or "(a first number) (a second number)," this means a range whose lower limit is the first number and whose upper limit is the second number. For example, 25 to 100 mm means a range whose lower limit is 25 mm, and whose upper limit is 100 mm.

The present disclosure relates to a stormwater runoff filtration/sorption system and method. In particular, the present disclosure relates to a filtration/sorption system and method for removing suspended solids, affiliated and dissolved pollutants from stormwater runoff, such as highway runoff, utilizing filtration/sorption media including steel slag without or with stable organic matter. Suspended solids can block light, deposit on organisms and exert an oxygen demand. In addition, runoff may contain dissolved pollutants and suspended particles that often carry pollutants such as phosphorous, hydrocarbons, and metals, such as lead (Pb), copper (Cu), and zinc (Zn).

The present disclosure addresses the need to control, as a best management practice, the concentration of dissolved pollutants in stormwater. For example, the concentrations of dissolved heavy metals such as Pb, Cu, and Zn present in stormwater can be substantially reduced by filtering the water through a filtration/sorption system as described below.

Figure 1A:
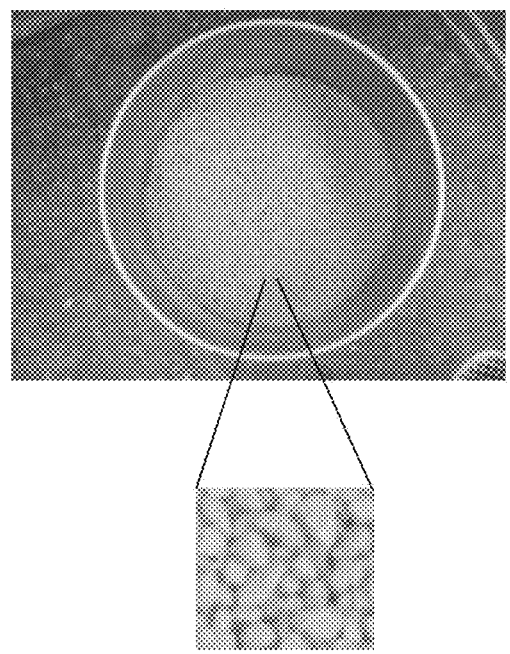
FIGS. 1A and B are depictions of various component materials which may be included in a filtration/sorption medium, according to an embodiment of the present disclosure.
Figure 1:
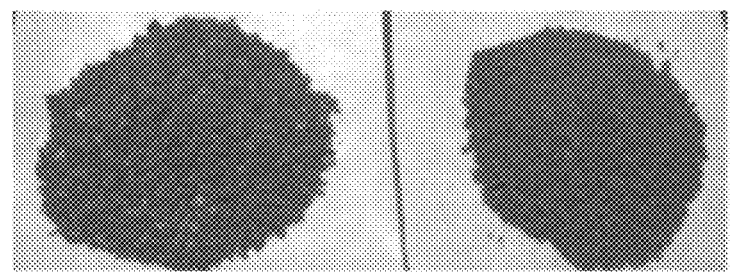

During the experiments, a filtration/sorption medium including steel slag, as shown in FIG. 1A, compost, as shown in FIG. 1B, and sand was tested in various compositions. Steel slag is a by-product of the steel making process that is produced during the separation of the molten steel from impurities in steel-making furnaces. The slag, which includes a solution of silicates and oxides, is produced as a molten liquid melt that solidifies upon cooling.

While various types of steel slag are known to those skilled in the art, experiments of the inventors of the present disclosure have shown blast furnace produced steel slag to be most effective for use in the filtration/sorption media described herein and which is low in contaminant metals. Likewise, while various types of compost are known to those skilled in the art, i.e., grass and food waste compost, manure compost, peat, etc., experiments of the inventors of the present disclosure have found grass and food waste compost to be most effective for use in the filtration/sorption media described herein. Various types of sand are also known to those skilled in the art. For use in a filtration/sorption system, sand having relatively large and uniform particle size is preferred, such as silica sand, which on average comprises 97% sand particles between 0.65 and 0.85 mm. This type of sand is suitable as a primary media because of its high hydraulic conductivity. Particle sizes of the compost and steel slag may vary depending on the desired rate of flow and treatment efficiency. The compost and steel slag used during the experiments performed by the inventors of the present disclosure was less than 2.83 mm for the compost particles, and less than 2 mm for the steel slag particles.

As described below, the steel slag including silicates and oxides, along with phosphorous included in the compost, were proven to be very effective at removing Pb and Cu from stormwater runoff. However, to curb the leaching of excess phosphorous from the compost used in the filtration/sorption media, the effluent water may be passed through a secondary layer of filtering, with media including an aluminum oxide sorbent, such as aluminum-based water treatment residuals (WTR), which are byproducts or wastes of large drinking water treatment plants, along with iron oxide minerals. For example, a composition consisting of 50% sand and 50% WTR may be used.

Experiments were performed by the inventors of the present disclosure using a mixture of the components described above, with a composition of 5% steel slag by mass, 25% compost by mass, and 70% sand by mass. While this composition has been demonstrated to be very effective, other compositions are also envisioned, and this disclosure is not intended to be limited to the above-mentioned composition. As an example, a composition including 8% steel slag by mass, 23% compost by mass, and 69% sand by mass. Samples of water were collected from stormwater runoff before (influent) and after (effluent) the water flowed through a filtration/sorption system including the filtration/sorption medium described herein. In the influent samples, Pb concentrations varied between 1 and 10 mg/L, Cu concentrations varied between 0.2 and 4 mg/L, and Zn concentrations varied between 20 and 400 µg/L. In the effluent samples, Pb concentrations were observed to vary between 15 and 200 µg/L, Cu concentrations varied between 5 and 60 µg/L, and Zn concentrations varied between 9-90 µg/L. By these observations, the concentration of Pb was reduced by 99%, the concentration of Cu was reduced by 98%, and the concentration of Zn was reduced by 41%.

While other containers are also envisioned, the filtration/sorption medium will typically be placed in a geosynthetic such as geotextile. A geosynthetic is a commercial polymeric material, such as 1120 N available from Koninklijke Ten Cate nv. These materials are currently used in a variety of applications for reinforcement, separation, filtration, and drainage of soils, and containment of liquids and gases. The most commonly used form of geosynthetic is geotextile, a material of synthetic fibers either woven or matted together. The system of the present disclosure is designed for the use of a nonwoven geotextile to provide filtration of runoff. This is because the pore size heterogeneity of nonwovens is similar to that of the sand filters that are currently in common use for stormwater runoff filtration. However, in accordance with the present disclosure, other types of geosynthetic materials, such as geocomposites, can be used for the geosynthetic filter. Geosynthetics, geotextiles, and geocomposites, and their use in filtration/sorption systems are further described in co-pending U.S. patent application Ser. No. 13/608,568, entitled "FILTRATION SYSTEM AND METHOD FOR REMOVING SUSPENDED SOLIDS AND AFFILIATED POLLUTANTS FROM STORMWATER RUNOFF USING A GEOSYNTHETIC FILTER," filed on Sep. 10, 2012, by Davis, the entire contents of which is hereby incorporated by reference.

The geotextile including the filtration/sorption medium may be rolled into a mat in a flattened, ellipsoidal tube form, with a diameter of between 1 and 2 feet. The mat including the geotextile and the filtration/sorption medium may then be placed around the perimeter of the landscape from which stormwater runoff should be treated. Stormwater runoff will be treated as it flows through the mat. In some embodiments, the mat may be planted or buried.

FIG. 2A is a top-view diagram of an example filtration/sorption system as used during the experiments described above. FIG. 2B shows a cross-sectional view of the example filtration/sorption system shown in FIG. 2A. The filtration/sorption media 204 is held in place by stainless steel screens 206, which are supported by screen supporting weirs 202. The filtration/sorption system also has an outlet port 208. However, as noted above, the filtration/sorption media described herein may be used with various other containers or filtration/sorption systems known in the art without the screens or sampling port used in experiments.

Stormwater runoff, especially from buildings, often has elevated acidity levels (lower pH). At pH levels below 5, carbonates that are transported in the stormwater runoff will be present as carbonic acid. At this pH level, much of the Pb and Cu in the solution would likely exist as dissolved free ions, $Pb^{2+}$ and $Cu^{2+}$.

Conventional filtration/sorption media consisting of compost simply trap the dissolved heavy metals and thus become more acidic over time. The filtration/sorption medium described in the present disclosure includes sand as well as compost and steel slag. The addition of the steel slag substantially increases the efficiency and effectiveness of the filtration/sorption medium by neutralizing the pH levels of the filtration/sorption medium which would otherwise become more acidic (lower pH level) due to the build-up of filtered particulate and dissolved heavy metals in the filtration/sorption medium. In particular, calcium and magnesium oxides and carbonates present in the steel slag control the media pH is a strong metal sorbent, and humic matter present in the compost provide a host of additional organic ligands that are available to bind with the dissolved heavy metals present in the stormwater runoff. The alkaline steel slag neutralizes acidity generated by the reaction of metals binding to the compost and iron oxide particles of the slag.

While various compositions of the filtration/sorption media may be used, the composition found to be most effective at reducing Pb and Cu levels in stormwater runoff, as determined by the experiments described above, comprises 70% by weight of sand, 25% by weight of compost, and 5% by weight of steel slag. This composition of filtration/sorption media may be retrofitted into existing containers used for filtering stormwater runoff, such as mats, manhole and drain covers, or various other containers.

For example, when using the above-described geotextile material as a container, the filtration/sorption medium may be placed inside a mat to be placed over or around an area where stormwater runoff travels. Additionally, by adding WTR, phosphate may also be removed from the stormwater runoff.

When vegetation is allowed to grow in or through the filtration/sorption medium, an additional benefit may be provided by the roots of the vegetation assisting with maintaining an open, porous filtration/sorption medium, as well as absorbing some of the dissolved metals trapped in the filtration/sorption medium. Vegetation may also provide aesthetic value to the placement of the container of the filtration/sorption medium.

While traditional sand filters can sufficiently perform the filtration functions necessary to remove suspended solids, they clog after some amount of time. After clogging, there is no method of cleaning the filter; instead the sand media must be fully or partially replaced in order to work properly again. This can be highly labor intensive. Replacing sand filters with geotextiles containing filtration/sorption media including steel slag without or with stable organic matter in the filtration/sorption system provides a substantial improvement in efficiency. Moreover, exchange of a sand filter with filtration/sorption media including steel slag without or with stable organic matter will provide a filter with substantially improved metal removal capability.

Although the present disclosure has been described in considerable detail with reference to certain preferred version thereof, other versions are possible and contemplated. Therefore, the spirit and scope of the appended claims should not be limited to the description of the preferred versions contained therein.

Any element in a claim that does not explicitly state "means for" performing a specified function or "step for" performing a specified function, is not to be interpreted as a "means" or "step" clause as specified in 35 U.S.C. § 112(f). In particular, the use of "step of" in the claims is not intended to invoke the provisions of 35 U.S.C. § 112(f).

What is claimed is:

1. A self-contained, movable adsorbent media mixture configured for being positioned on a surface and along a fluid path, said adsorbent media mixture comprising:
    a geosynthetic material; and
    a media mixture including compost, sand, and an alkaline material.

2. The adsorbent media mixture according to claim 1, wherein the adsorbent media mixture further includes a sock, wherein said geosynthetic material and media mixture are disposed within the sock, said sock having a plurality of openings for enabling fluid flow to permeate through the sock, wherein the geosynthetic material and media mixture disposed within the sock receive the fluid flow and remove suspended solids and other pollutants, including heavy metals.

3. The adsorbent media mixture according to claim 1, wherein the alkaline material is steel slag.

4. The adsorbent media mixture according to claim 3, wherein the steel slag is blast furnace produced steel slag.

5. The adsorbent media mixture according to claim 3, wherein the composition of the media mixture is 23%-25% by weight compost, 69%-70% by weight sand, and 5%-8% by weight steel slag.

6. The adsorbent media mixture according to claim 1, further comprising an aluminum oxide sorbent.

7. The adsorbent media mixture according to claim 1, wherein vegetation is grown in or through the adsorbent media mixture.

8. The adsorbent media mixture according to claim 1, wherein fluid flow in the fluid path comprises stormwater runoff or any other contaminated water.

9. The adsorbent media mixture according to claim 1, wherein the adsorbent media mixture is configured for placement in proximity to an opening of a drainage system or in proximity to a building wall.

10. A method for removing suspended solids and other pollutants from fluid flow, the method comprising:
    receiving the fluid flow containing suspended solids and other pollutants;
    providing a self-contained, movable adsorbent media mixture configured for being positioned on a surface and along the fluid flow, the media mixture comprising a sock having a plurality of openings, and a composition that includes compost, sand, and an alkaline material disposed within the sock; and
    removing the suspended solids and other pollutants, including heavy metals, from the fluid flow by the media mixture.

11. The method according to claim 10, wherein the adsorbent media mixture comprises a filter, wherein the filter comprises an aluminum oxide sorbent.

12. The method according to claim 11, wherein the aluminum oxide sorbent is used to remove phosphate from the fluid flow.

13. The method according to claim 10, wherein vegetation is grown in or through the adsorbent media mixture.

14. The method according to claim 10, wherein the suspended solids and other pollutants include lead, copper, and/or zinc.

15. The method according to claim 10, further comprising placing the adsorbent media mixture in proximity to an opening of a drainage system or in proximity to a building wall.

16. The method according to claim 10, wherein the alkaline material is steel slag.

17. The method according to claim 16, wherein the composition of the media mixture is 23%-25% by weight compost, 69%-70% by weight sand, and 5%-8% by weight steel slag.

* * * * *